United States Patent
Wu

(10) Patent No.: US 8,807,844 B2
(45) Date of Patent: Aug. 19, 2014

(54) OPTICAL FIBER COUPLING ASSEMBLY WITH CABLE

(75) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 100 days.

(21) Appl. No.: 13/445,942

(22) Filed: Apr. 13, 2012

(65) Prior Publication Data

US 2013/0142486 A1    Jun. 6, 2013

(30) Foreign Application Priority Data

Dec. 1, 2011  (TW) .............................. 100144253 A

(51) Int. Cl.
*G02B 6/38* (2006.01)

(52) U.S. Cl.
USPC ............................................. 385/59; 385/55

(58) Field of Classification Search
USPC .......................................................... 385/59
See application file for complete search history.

(56) References Cited

U.S. PATENT DOCUMENTS

2010/0046891 A1* 2/2010 Sabo .............................. 385/74

\* cited by examiner

*Primary Examiner* — Uyen Chau N Le
*Assistant Examiner* — Kajli Prince
(74) *Attorney, Agent, or Firm* — Novak Druce Connolly Bove + Quigg LLP

(57) ABSTRACT

An optical fiber coupling assembly includes a first optical fiber connector, a second optical fiber connector, and a cable. The first optical fiber connector defines a number of first blind holes receiving first focus lenses, and first through holes respectively communicating with the first blind holes. The second optical fiber connector defines a number of second blind holes receiving second focus lenses, and second through holes respectively communicating with the second blind holes. The cable includes a number of optical fibers. Each optical fiber includes a first end and a second end, and the first end is received in a corresponding one of the first through holes and aligned with the a corresponding one of the first focus lenses, and the second end is received in a corresponding one of the second through holes and aligned with a corresponding one of the second focus lenses.

6 Claims, 4 Drawing Sheets

OPTICAL FIBER COUPLING ASSEMBLY WITH CABLE

BACKGROUND

1. Technical Field

The present disclosure relates to optical fiber connectors, and more specifically to an optical fiber coupling assembly with a cable.

2. Description of Related Art

Optical fiber coupling assemblies are preferred for use in data transmission between computers and portable electronic devices due to their high transmission speed and signal integrity. Generally, an optical fiber coupling assembly includes an optical fiber plug and an optical fiber jack capable of coupling to an optical fiber plug. When in use, the optical fiber plug is inserted into and coupled to the optical fiber jack, such that the computers and the portable electronic device can transmit data signals in the form of light through a number of optical fibers provided in the optical fiber plug and the optical fiber jack.

Although this type of optical fiber coupling assembly is somewhat useful, an optical fiber coupling assembly with a new structure is still needed.

BRIEF DESCRIPTION OF THE DRAWINGS

Many aspects of the present disclosure can be better understood with reference to the following drawings. The elements in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
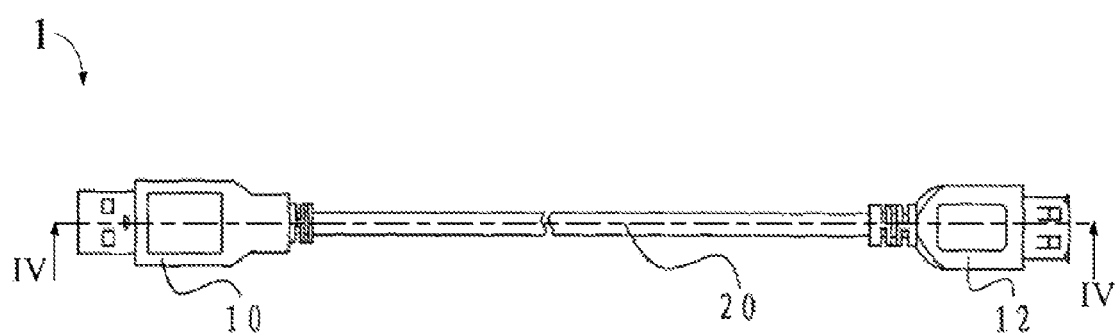
FIG. 1 is an isometric view of an optical fiber coupling assembly with a cable, in accordance with an embodiment.

Referring to FIG. 1, an exemplary embodiment of an optical fiber coupling assembly 1 configured for connecting a first electronic device (e.g., a computer) to a second electronic device (e.g. a portable electronic device) is illustrated. The assembly 1 includes a first optical fiber connector 10, a second optical fiber connector 12, and a cable 20 connecting the first connector 10 to the second connector 12.

In the embodiment, the first connector 10 is an optical fiber plug capable of mating with an optical fiber jack provided in the computer, and the second connector 12 is an optical fiber jack capable of mating with an optical fiber plug provided in the portable electronic device, such that digital signals in the form of light can be transmitted between the computer and the portable electronic device when the computer and the portable electronic device are connected via the assembly 1. In an alternative embodiment, the first and second connectors 10, 12 may be some other combination of the optical fiber jack or the optical fiber plug. For example, each of the first and second connectors 10, 12 may be an optical fiber jack or an optical fiber plug.

Figure 2:
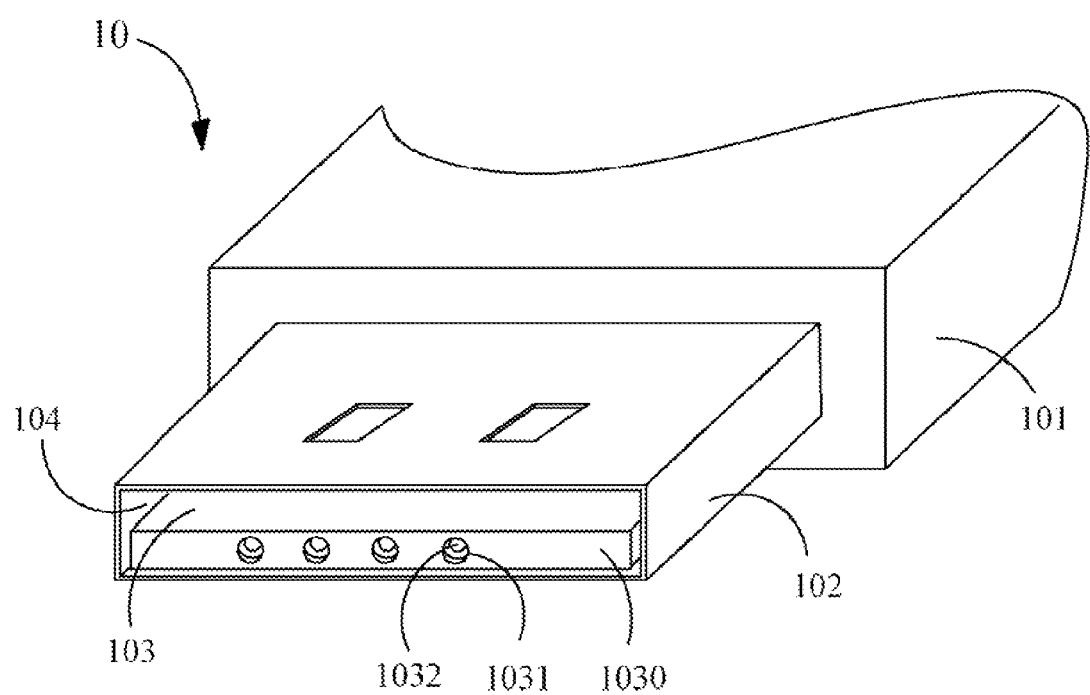
FIG. 2 is an isometric view of a first optical fiber connector of the optical fiber coupling assembly of FIG. 1.

Referring to FIG. 2, the first connector 10 includes a first base 101, a first casing 102 protruding from the first base 101, and a first tongue portion 103 received in the first casing 102. The first tongue portion 103 includes an end 1030 adjacent to the front end of the casing 102. A number of first blind holes 1031 are defined in the end surface 1030, and a number of first focus lenses 1033 (further shown in FIG. 4) are respectively received in the first blind holes 1031. In the embodiment, each of the first focus lenses 1033 is fixed to the corresponding first blind hole 1031 such as by gluing or friction fit for example. The first tongue portion 103 further defines a number of first through holes 1032 configured for receiving optical fibers 202 (further shown in FIG. 4). The first through holes 1032 are respectively communicating with the blind holes 1031 to form stepped holes, and extend through the first base 101 along a lengthwise direction of the first base 101.

In the embodiment, the first tongue portion 103 and an inner surface of the first casing 101 cooperatively form a space 104 therebetween for receiving the corresponding fixing member of the optical fiber jack provided in the computer when the first connector 10 is inserted into the optical fiber jack. However, the manner of connection between the first connector 10 and the optical fiber jack is not limited and can be varied according to need.

Figure 3:
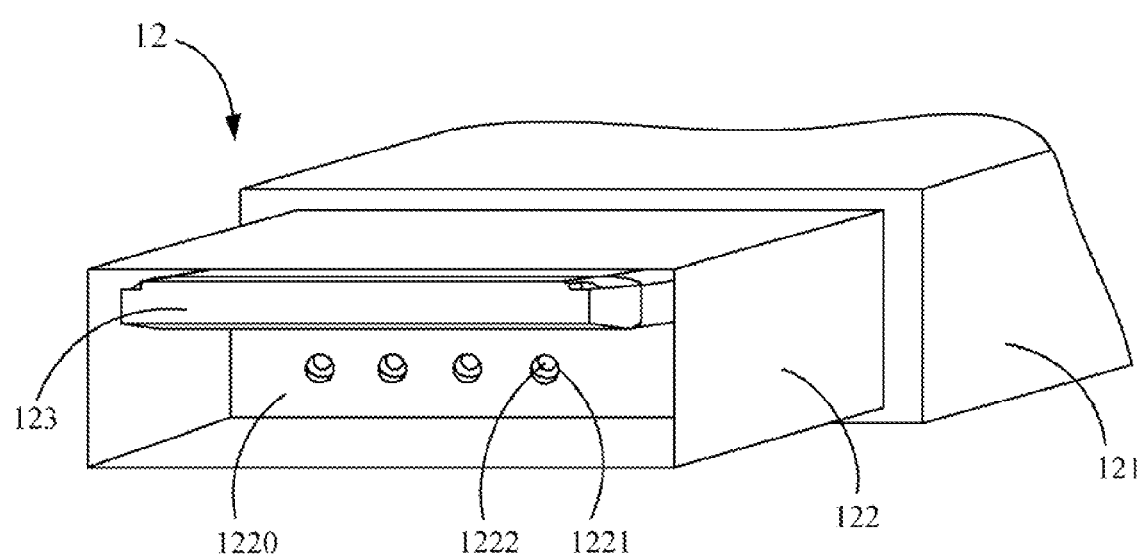
FIG. 3 is an isometric view of a second optical fiber connector of the optical fiber coupling assembly of FIG. 1.

Referring to FIG. 3, the second connector 12 includes a second base 121 and a second casing 122 protruding from the second base 121. The second casing 122 includes a bottom surface 1220 parallel to a junction surface of the second base 121 and the second casing 122. A number of second blind holes 1221 are defined in the bottom surface 1220, and a number of second focus lenses 1223 (further shown in FIG. 4) are respectively received in the second blind holes 1221. In the embodiment, the second focus lenses 1223 are respectively fixed to the second blind holes 1221. The second base 121 further defines a number of second through holes 1222 for receiving the optical fibers 202. The second through holes 1222 are respectively communicating with the second blind holes 1221 to form stepped holes, and extend through the second base 121 along a lengthwise direction of the second base 121.

In the embodiment, the second connector 12 further includes a second tongue portion 123 perpendicularly protruding from the bottom surface 1220. When the optical fiber plug provided in the portable electronic device is inserted into the second connector 12, the second tongue portion 123 is engaged with the corresponding fixing member of the optical fiber plug. However, the manner of connection between the second connector 12 and the optical fiber plug is not limited and can be varied according to need.

Figure 4:
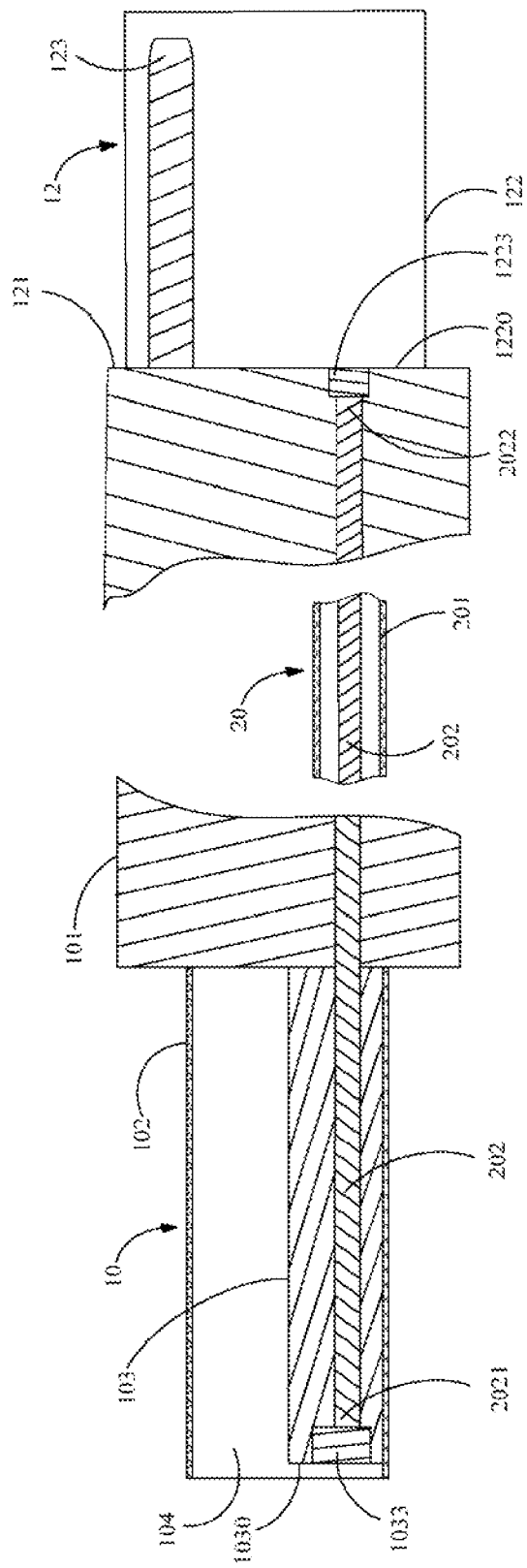
FIG. 4 is a partial, sectional view of the optical fiber coupling assembly taken along line IV-IV of FIG. 1.

Referring to FIG. 4, the cable 20 includes a wrapping layer 201 connected with the first and second bases 101, 121 and a number of optical fibers 202 received in the wrapping layer 201. FIG. 4 shows only one optical fiber 202 for the sake of simplicity. Each optical fiber 202 includes a first end portion 2021 and a second end portion 2022. The first end portion 2021 of the optical fiber 202 is received in a corresponding one of the first through hole 1032 and aligned with a corresponding one of the first focus lenses 1033, and the second focus lens 1223 is received in a corresponding one of the second through hole 1222 and aligned with a corresponding one of the second focus lenses 1223.

When in use, the first connector 10 is coupled to the optical fiber jack of the computer, and the second connector 12 is coupled to the optical fiber plug of the portable electronic device. If the computer is used as a digital signals emitting terminal, and the portable electronic device is used as a digital signals receiving terminal, then light from the first connector 10 is focused and collimated by the first focus lenses 1033, and further passes through the optical fibers 202 and the second optical lens 1223 to the portable electronic device, thereby achieving the digital data transmission. Similarly, if the portable electronic device is used as a digital signals emitting terminal, and the computer is used as a digital signals receiving terminal, then light from the second connector 12 is focused and collimated by the second focus lenses 1223, and then passes through the optical fibers 202 and the first focus lens 1033 to the computer, thereby achieving the digital data transmission. Furthermore, the disposition of the first and second through holes 1032, 1222 and the first and second blind holes 1031, 1221 allows the optical axis of each optical fiber 202 to be respectively coaxial with the optical axis of the first and second focus lenses 1033, 1223, such that light is effectively transmitted through the assembly 1.

Although the present disclosure has been described in accordance with the embodiments shown, one of ordinary skill in the art will readily recognize that there could be variations to the embodiments and those variations would be within the spirit and scope of the present disclosure. Accordingly, many modifications may be made by one of ordinary skill in the art without departing from the spirit and scope of the appended claims.

What is claimed is:

1. An optical fiber coupling assembly, comprising:
   a first optical fiber connector defining a plurality of first blind holes receiving a plurality of first focus lenses, and a plurality of first through holes respectively communicating with the corresponding first blind holes;
   a second optical fiber connector defining a plurality of second blind holes receiving a plurality of second focus lenses, and a plurality of second through holes respectively communicating with the corresponding second blind holes; and
   a cable comprising:
      a wrapping layer connected with the first and the second optical fiber connectors; and
      a plurality of optical fibers received in the wrapping layer, and each optical fiber comprising a first end portion and an opposite, second end portion, and the first end portion being received in a corresponding one of the first through holes and aligned with a corresponding one of the first focus lenses, and the second end portion being received in a corresponding one of the second through holes and aligned with a corresponding one of the second focus lenses.

2. The optical fiber coupling assembly as described in claim 1, wherein the first optical fiber connector is an optical fiber plug, and comprises:
   a first base;
   a first casing protruding from the first base; and
   a first tongue portion received in the first casing and comprising an end, wherein the first blind holes are defined in the end, and the first through holes are defined in the first tongue portion and extending through the first base.

3. The optical fiber coupling assembly as described in claim 2, wherein the first tongue portion and the first casing cooperatively form a space therebetween for receiving a corresponding fixing member of an optical fiber jack.

4. The optical fiber coupling assembly as described in claim 1, wherein the second optical fiber connector is an optical fiber jack, and comprises:
   a second base; and
   a second casing connected to the second base and comprising a bottom surface, wherein the second blind holes are defined at the bottom surface, and the second through holes are defined in the second base and extending through the second base.

5. The optical fiber coupling assembly as described in claim 4, wherein the second optical fiber connector further comprises a second tongue portion perpendicularly protruding from the bottom surface and configured to engage with an optical fiber plug.

6. The optical fiber coupling assembly as described in claim 1, wherein each of the plurality of first focus lenses is fixed to the corresponding first blind hole by gluing, and each of the plurality of second focus lenses is fixed to the corresponding second blind hole by gluing.

* * * * *